(12) United States Patent
Fukunaga (10) Patent No.: US 11,463,624 B2
(45) Date of Patent: Oct. 4, 2022

(54) IMAGING DEVICE, IMAGING METHOD, DISPLAY DEVICE, AND DISPLAY METHOD THAT CAPTURE A PARTICULAR CAPTURING REGION CORRESPONDING TO A SELECTED CUTOUT IMAGE

(71) Applicant: CANON KABUSHIKI KAISHA, Tokyo (JP)

(72) Inventor: Kentaro Fukunaga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 859 days.

(21) Appl. No.: 16/182,894

(22) Filed: Nov. 7, 2018

(65) Prior Publication Data
US 2019/0149744 A1    May 16, 2019

(30) Foreign Application Priority Data

Nov. 10, 2017  (JP) .............................. JP2017-217225

(51) Int. Cl.
*H04N 5/232* (2006.01)
*H04N 1/00* (2006.01)
(Continued)

(52) U.S. Cl.
CPC ... *H04N 5/232945* (2018.08); *H04N 1/00129* (2013.01); *H04N 5/2258* (2013.01);
(Continued)

(58) Field of Classification Search
CPC ............. H04N 5/23299; H04N 13/128; H04N 13/239; G06T 7/593
See application file for complete search history.

(56) References Cited

U.S. PATENT DOCUMENTS 8,314,831 B2    11/2012  Morimoto
8,760,518 B2 *   6/2014  Matsuzawa ........ H04N 5/23219
                                                    348/157
(Continued)

FOREIGN PATENT DOCUMENTS

CN    101707671 A    5/2010
CN    104052931 A    9/2014
(Continued)

OTHER PUBLICATIONS

Chinese Office Action dated Aug. 4, 2021, issued in corresponding Chinese Application No. 201811331758.8.
(Continued)

*Primary Examiner* — Twyler L Haskins
*Assistant Examiner* — Fayez A Bhuiyan
(74) *Attorney, Agent, or Firm* — Venable LLP (57) ABSTRACT

An imaging device includes a first imaging unit that captures a first capturing region, a second imaging unit that captures a second capturing region of the first capturing region, a holding unit that holds position information corresponding to the second capturing region captured by the second imaging unit, an output unit that outputs a cutout image of the second capturing region corresponding to the position information held by the holding unit out of a captured image captured by the first imaging unit, and a change unit that, when one of a plurality of cutout images output by the output unit is selected, controls the second imaging unit so as to capture the second capturing region corresponding to the selected cutout image.

22 Claims, 7 Drawing Sheets

(51) Int. Cl.
*H04N 5/225* (2006.01)
*H04N 5/247* (2006.01)

(52) U.S. Cl.
CPC ..... *H04N 5/23206* (2013.01); *H04N 5/23238* (2013.01); *H04N 5/23296* (2013.01); *H04N 5/23299* (2018.08); *H04N 5/247* (2013.01)

(56) References Cited

U.S. PATENT DOCUMENTS

| | | |
|---|---|---|
| 9,369,612 B2 | 6/2016 | Oh et al. |
| 9,609,205 B2 | 3/2017 | Morimoto |
| 9,826,169 B2 | 11/2017 | Suzuki et al. |
| 10,129,480 B2 | 11/2018 | Kawano |
| 2004/0109071 A1 | 6/2004 | Kido et al. |
| 2013/0265467 A1 | 10/2013 | Matsuzawa et al. |

FOREIGN PATENT DOCUMENTS

| | | |
|---|---|---|
| CN | 104427245 A | 3/2015 |
| CN | 105300990 A | 2/2016 |
| CN | 105933660 A | 9/2016 |
| CN | 106455943 A | 2/2017 |
| JP | 2007-043505 A | 2/2007 |
| JP | 2013-251783 A | 12/2013 |
| JP | 2014-215564 A | 11/2014 |
| JP | 2014-236313 A | 12/2014 |

OTHER PUBLICATIONS

Chinese Office Action dated Oct. 9, 2020, issued in corresponding Chinese Application No. 201811331758.8.

* cited by examiner

IMAGING DEVICE, IMAGING METHOD, DISPLAY DEVICE, AND DISPLAY METHOD THAT CAPTURE A PARTICULAR CAPTURING REGION CORRESPONDING TO A SELECTED CUTOUT IMAGE

This application claims the benefit of Japanese Patent Application No. 2017-217225 filed Nov. 10, 2017, which is hereby incorporated by reference herein in its entirety.

BACKGROUND OF THE INVENTION

Field of the Invention

The present invention relates to an imaging device, an imaging method, a display device, and a display method.

Description of the Related Art

Conventionally, as one of schemes by which a user changes a capturing region of an imaging device, a scheme of using an image captured by the imaging device in the past is used. For example, Japanese Patent Application Laid-Open No. 2007-43505 discloses a technology in which a panoramic image created by using images captured in the past is displayed on a display unit, and once the user selects a particular region in the displayed panoramic image, the capturing region is changed to the selected region. Japanese Patent Application Laid-Open No. 2014-236313 discloses that, when the same region is captured by using the same camera, a pan angle, a tilt angle, a zoom position, or the like, is acquired from the past captured image, and capturing is performed at the same pan angle, or the like, as the past captured image.

In Japanese Patent Application Laid-Open No. 2007-43505 and Japanese Patent Application Laid-Open No. 2014-236313, since images captured in the past are used, these techniques are useful in terms of a reduction in load or power, or useful in an application of comparing the statuses of the same capturing region of a certain past time and the current time. When an object to be paid attention to is a moving object, however, there is a demand for always having the latest state of an image to be used in order to change a capturing region after confirming that the moving object appears in a particular region.

But, Japanese Patent Application Laid-Open No. 2007-43505 and Japanese Patent Application Laid-Open No. 2014-236313 do not support such a demand. Accordingly, the object of the present invention is to enable a change of a capturing region of an imaging device while allowing the user to confirm the current state of a region captured in the past.

SUMMARY OF THE INVENTION

An imaging device according to the present invention comprises a first imaging unit that captures a first capturing region, a second imaging unit that captures a second capturing region of the first capturing region, a holding unit that holds position information corresponding to the second capturing region captured by the second imaging unit, an output unit that outputs a cutout image of the second capturing region corresponding to the position information held by the holding unit out of a captured image captured by the first imaging unit, and a change unit that, when one of a plurality of cutout images output by the output unit is selected, controls the second imaging unit so as to capture the second capturing region corresponding to the selected cutout image.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Imaging System

An imaging system 10 according to a first embodiment of the present invention will be described with reference to FIG. 1. The imaging system 10 has an imaging device 100 and a UI display unit 140 connected to the imaging device 100 via an IP network 130. The imaging device 100 is installed to a ceiling or a wall in a room. The UI display unit 140 is a display device (a client device), which is a general purpose computer having a CPU, a ROM, and a RAM. The imaging device 100 has a wide angle camera 110, a pan-tilt-zoom camera (PTZ camera) 120, a system control unit 124, and a storage unit 125. The imaging device 100 of the present embodiment is an imaging device in which the wide angle camera 110 and the PTZ camera 120 are integrated. The wide angle camera 110 and the PTZ camera 120 are accommodated in the same casing. The imaging device 100 is connected via a wire or wirelessly to the UI display unit 140 via the IP network 130 in a state where the imaging device 100 and the UI display unit 140 can communicate with each other. The term UI is an abbreviation for User Interface.

The wide angle camera 110 is formed of a capturing optical system 111 formed of a wide angle lens, or the like, for acquiring an image of a wide view angle, an image pickup device unit 112, and an image processing unit 113. The wide angle camera 110 of the present embodiment does not have means for changing a capturing direction (pan angle, tilt angle) and a zoom position (view angle). Further, the wide angle camera 110 of the present embodiment is formed of a single camera. The wide angle camera 110 has a view angle wider than that of the PTZ camera 120. The wide angle camera 110 captures a predetermined capturing region.

The PTZ camera 120 is formed of a capturing optical system 121 formed of a zoom lens, a focus lens, an aperture mechanism, or the like, an image pickup device unit 122, an image processing unit 123, a drive control unit 126, a zoom motor 127, a pan motor 128, and a tilt motor 129. The PTZ camera 120 can adjust focus or aperture by driving the capturing optical system 121 by using the drive control unit

126. Further, the PTZ camera 120 can change the capturing direction, the view angle, or the like, of the PTZ camera 120 by driving the zoom motor 127, the pan motor 128, and the tilt motor 129. That is, the PTZ camera 120 can change the capturing region. The PTZ camera 120 stores, in the storage unit 125, information on the pan angle, the tilt angle, and the zoom position (view angle) obtained before the capturing region is changed. While the view angle of the PTZ camera 120 is narrower than the view angle of the wide angle camera 110, the PTZ camera 120 can change the capturing region over the entire view angle range of the wide angle camera 110 by driving the motors 127, 128, and 129. The PTZ camera 120 captures a capturing region within a predetermined capturing region captured by the wide angle camera 110.

The system control unit 124 performs a process such as camera control, encoding (coding) of an image, generation of a display image, storage to the storage unit 125, a network delivery, cutout of an image (digital PTZ) of the wide angle camera 110, or the like. The camera control performed by the system control unit 124 includes control of the wide angle camera 110 and control of the PTZ camera 120. When an image from the wide angle camera 110 is cut out, a certain region is designated from a captured image from the wide angle camera 110 displayed on the UI display unit 140, and thereby a cutout process can be performed. The system control unit 124 outputs the cut out image as a cutout image. The system control unit 124 is formed of a CPU, for example. The system control unit 124 transmits a captured image captured by the wide angle camera 110 to the UI display unit 140.

The storage unit 125 is formed of a ROM and a RAM, for example. The ROM stores a program, or the like, required for the system control unit (CPU) 124 to perform a process, for example. The CPU performs a process based on the program stored in the ROM, and thereby a function or a process (FIG. 3), or the like, of the imaging device 100 is implemented. Note that this program, or the like, may be stored in an external memory or a removable storage medium (not illustrated). The RAM is a memory device used for expanding a program read out from the ROM by the CPU and performing the process thereof. Further, the RAM is also used as a storage region used for temporarily storing data to be subjected to various processing as a temporal storage memory. Further, the storage unit 125 can hold a plurality of pieces of pan-tilt-zoom (PTZ) position information viewed through the PTZ camera 120 in the past. For the position viewed by the PTZ camera 120, the system control unit 124 extracts a PTZ position at which there has been no movement over a predetermined time and acquires position information (pan angle, tilt angle, zoom magnification) at this time from the drive control unit 126.

The IP network 130 transmits and receives data based on an Internet protocol. The UI display unit 140 is a personal computer or a tablet terminal (or a display unit thereof), for example, and has an input/output function or a communication function. The UI display unit 140 transmits various commands such as an instruction of change of a capturing parameter or control of each of the motors 127 to 129, start of a video streaming, or the like, to the wide angle camera 110 and the PTZ camera 120. This command transmission enables the UI display unit 140 to control the wide angle camera 110 and the PTZ camera 120. The imaging device 100 transmits a response or a video streaming to the UI display unit 140 in response to the command described above.

Figure 1:
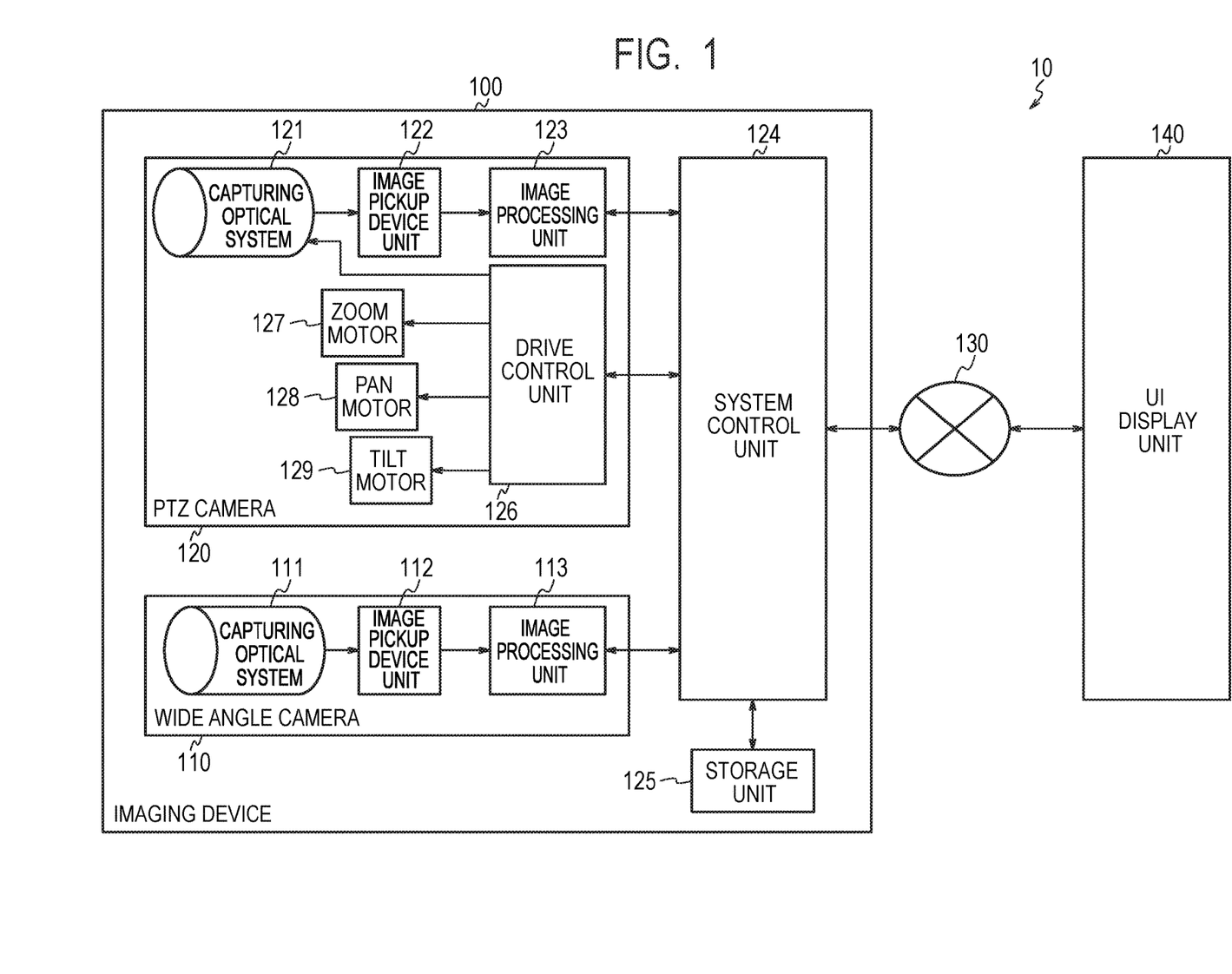
FIG. 1 is a block diagram of an imaging device and a user interface (UI) display unit.

Respective function modules (the image processing unit 113, the image processing unit 123, the system control unit 124, the drive control unit 126) illustrated in FIG. 1 are implemented by software or hardware. When the functions are implemented by software, a program for providing the functions of respective function modules described above is stored in the ROM of the storage unit 125. The stored program is read to the RAM of the storage unit 125 as appropriate and executed by the CPU of the system control unit 124, and thereby the functions of the above function modules are implemented.

On the other hand, when the functions are implemented by hardware, a predetermined compiler may be used to automatically generate a dedicated circuit on an FPGA from a program used for implementing the functions of respective function modules, for example. The term FPGA is an abbreviation for Field Programmable Gate Array.

Further, a gate array circuit may be configured in the same manner as an FPGA and implemented as hardware. Further, an Application Specific Integrated Circuit (ASIC) may be used for implementation. Note that the configuration of the function modules illustrated in FIG. 1 is an example, and a plurality of function modules may form a single function module or any of the function modules may be divided into modules that perform a plurality of functions.

UI Display Unit

Figure 2:
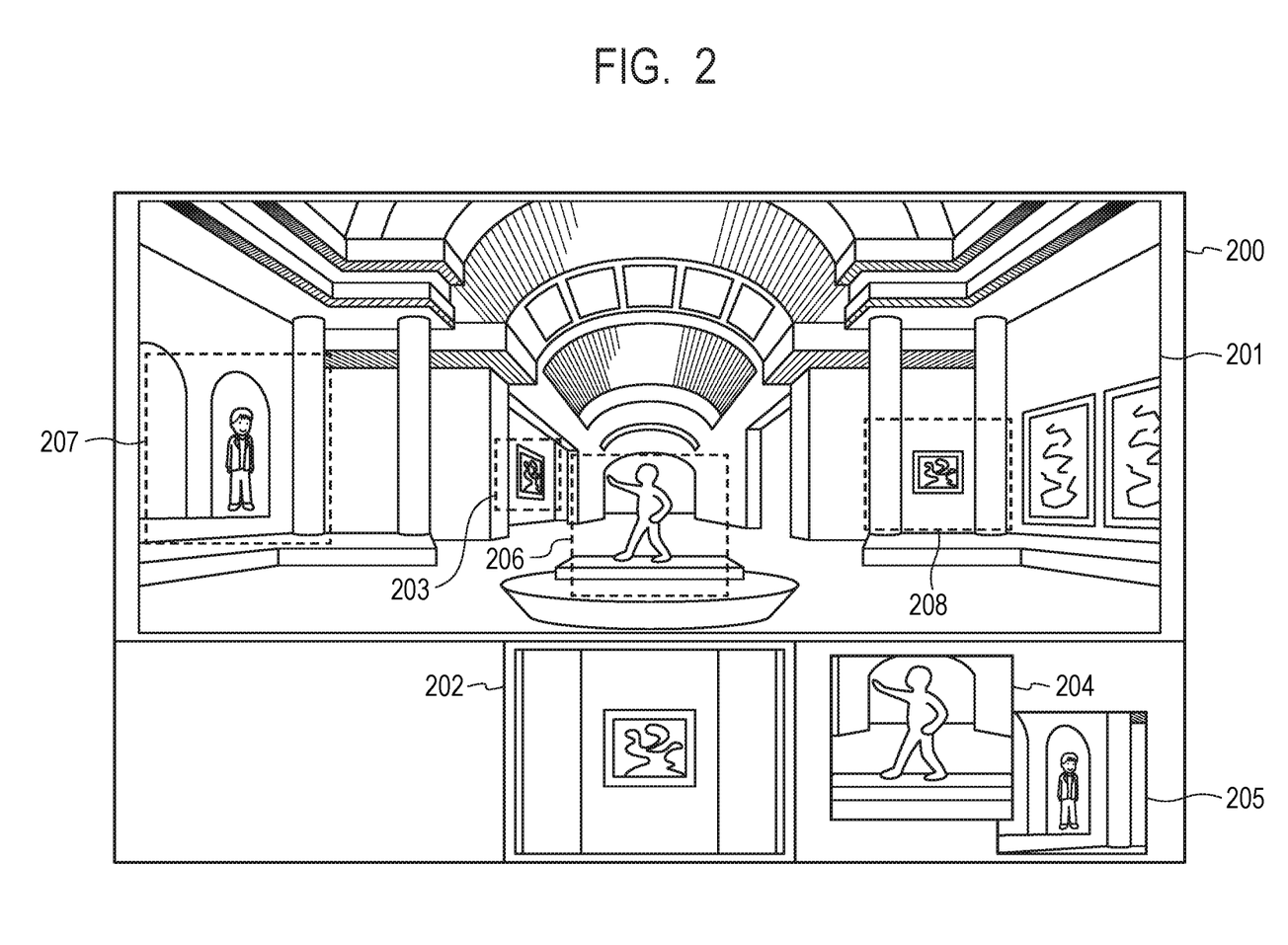
FIG. 2 is a diagram illustrating the UI display unit.

FIG. 2 illustrates images 201, 202, 204, and 205 generated by the system control unit 124 and displayed on the UI display unit 140. A display screen 200 of the UI display unit 140 is a UI used by the user. The UI display unit 140 has a display unit that displays the images 201, 202, 204, and 205. The image 201 is a real-time image of a region captured by the wide angle camera 110. The image 202 is a real-time image of a region (capturing region 208) captured by the PTZ camera 120.

In the present embodiment, the capturing region of the wide angle camera 110 and the pan angle, the tilt angle, and the zoom (telephoto, wide angle) position of the PTZ camera 120 are linked (related, associated) with each other. For example, once the user designates a region 203 within the image 201 from the UI display unit 140, the system control unit 124 drives each of the motors 127 to 129 so that the PTZ camera 120 captures the region 203 based on the information on the pan angle, the tilt angle, and the zoom position linked with the region 203. This motor driving enables a change of the capturing region of the PTZ camera 120.

The image 204 is a thumbnail image in which the capturing region 206 captured at the immediately previous attitude of the PTZ camera 120 is cut out from an image currently captured by the wide angle camera 110 and is displayed. The image 205 is a thumbnail image in which the capturing region 207 captured at the second previous attitude of the PTZ camera 120 is cut out from an image currently captured by the wide angle camera 110 and is displayed. Information (capturing information) on the pan angle, the tilt angle, and the zoom position of the PTZ camera 120 obtained when the capturing region 206 is captured is linked with the thumbnail image 204 and stored in the storage unit 125.

Information on the pan angle, the tilt angle, and the zoom position of the PTZ camera 120, obtained when the capturing region 207 is captured, is linked with the thumbnail image 205 and stored in the storage unit 125. Each of the capturing regions (capturing ranges) 203 and 206 to 208 indicates a region to be cut out from the image 201 and therefore may be referred to as a cutout region. Further, the thumbnail images 204 and 205 are cutout images. Note that the system control unit 124 may display a guide corresponding to each cutout image so as to overlap with the image 201. In this case, the color or the display form of the line of the guide may differ for each position information held by the storage unit 125 to improve visibility.

Change of Capturing Region of PTZ Camera

Figure 3:
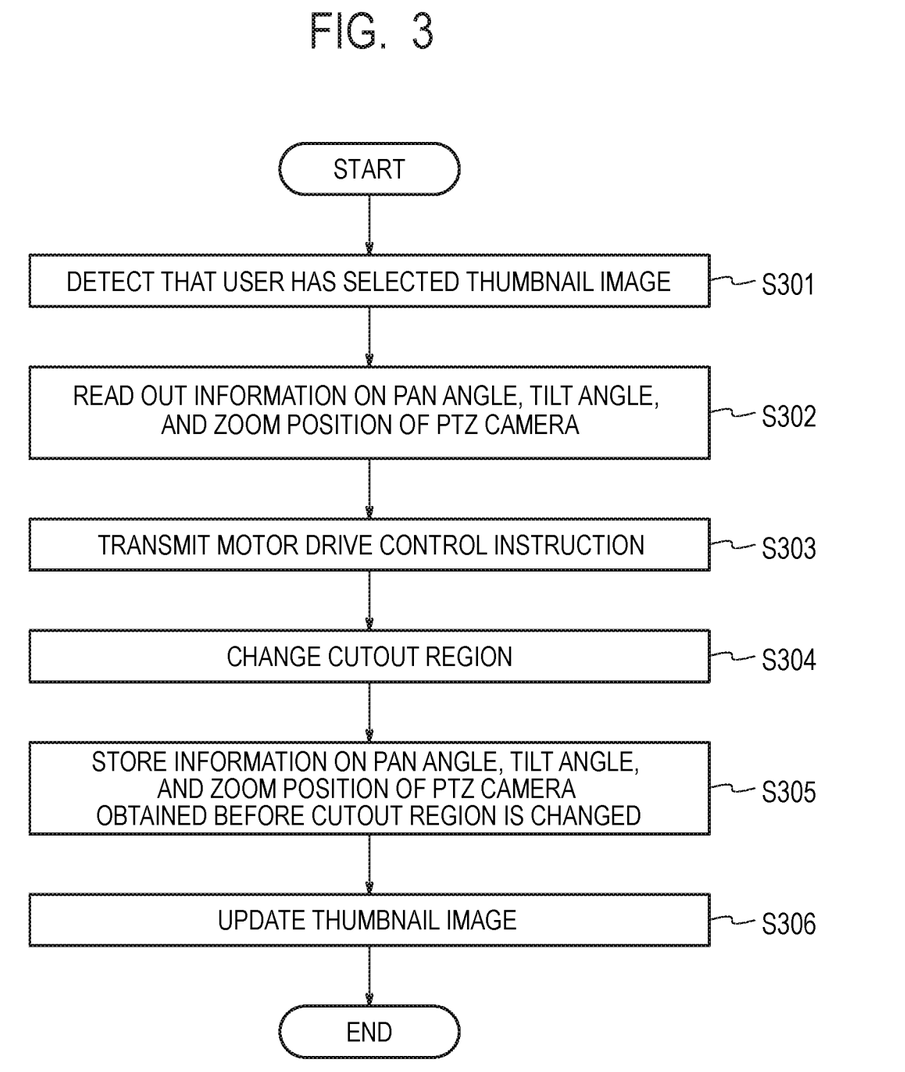
FIG. 3 is a flowchart illustrating a change method of a capturing region.
Figure 4A:
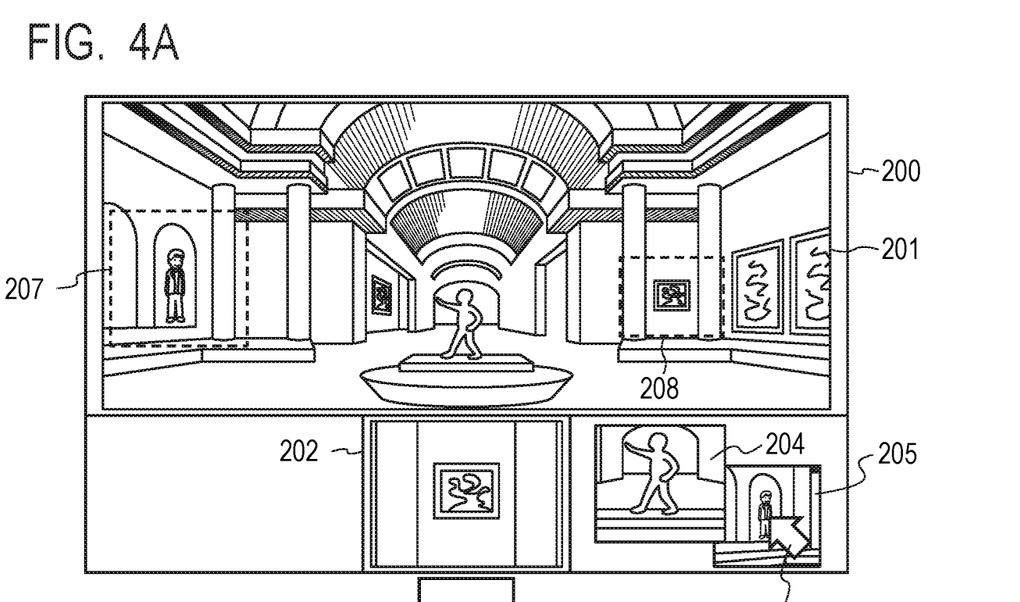
FIG. 4A and FIG. 4B are diagrams illustrating a change method of a capturing region.
Figure 4B:
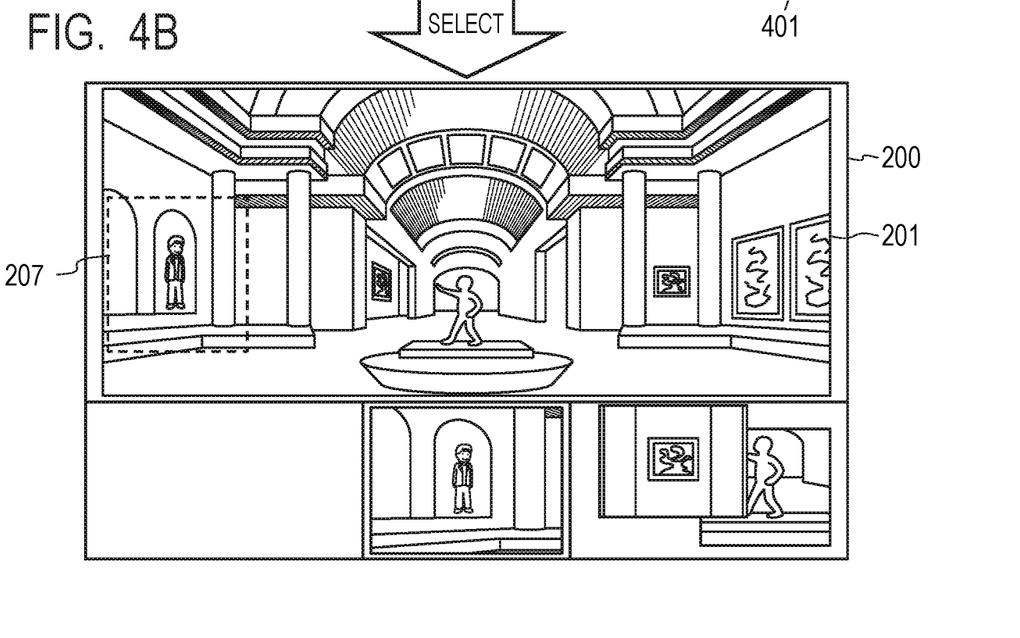

A flow when the pan angle, the tilt angle, and the zoom position of the PTZ camera 120 are changed so as to capture a past capturing region will be described by using FIG. 3, FIG. 4A, and FIG. 4B. As illustrated in FIG. 4A, first, the system control unit 124 (FIG. 1) detects that the user has selected the thumbnail image 205 by using a pointer 401 (S301). The system control unit 124 then reads out, from the storage unit 125, information on the pan angle, the tilt angle, and the zoom position of the PTZ camera 120 linked with the thumbnail image 205 and stored (S302). The system control unit 124 transmits an instruction to the drive control unit 126 of the PTZ camera 120 so as to drive the zoom motor 127, the pan motor 128, and the tilt motor 129, based on the read out information on the pan angle, the tilt angle, and the zoom position (S303). That is, the system control unit 124 transmits a drive instruction of each of the motors 127 to 129 to the drive control unit 126 so that the PTZ camera 120 captures the region 207.

Next, on the image 201 captured by the wide angle camera 110, the system control unit 124 changes the cutout region 207 of the selected thumbnail image 205 to the region 208 that has been captured by the PTZ camera 120 before image selection (S304). Subsequently, the system control unit 124 stores, in the storage unit 125, information on the pan angle, the tilt angle, and the zoom position of the PTZ camera 120 obtained before the capturing region is changed in link with the image (the image 202 of FIG. 2) (S305). Finally, the system control unit 124 updates the displayed thumbnail image (S306). Specifically, the image 202 of FIG. 4A is updated to the image 204 because the image 202 is "an image captured at the immediately previous attitude (the latest image)", and the image 204 of FIG. 4A is updated to the image 205 because the image 204 is "an image captured at the second previous attitude". The thumbnail image 205 of FIG. 4A will be deleted. This state is illustrated in FIG. 4B.

In such a way, after confirming the current status by viewing the real-time image 201 (FIG. 4A) captured by the wide angle camera 110, the user can change the capturing region of the PTZ camera 120 to the capturing region 207 that has been set in the past. (The image 202 of FIG. 4A has changed to an image of the region 207 in FIG. 4B.) Note that, while two thumbnail images (the thumbnail images 204 and 205) of capturing regions captured in the past are displayed in the display screen 200 in the above description, the present embodiment is not limited to such a display form. For example, only a single thumbnail image of a capturing region captured in the past may be displayed in the display screen 200, or three or more thumbnail images of capturing regions captured in the past may be displayed in the display screen 200.

Further, in FIG. 4A, when the thumbnail images 204 and 205 are displayed on the display screen 200, the thumbnail image 204 is displayed on the front layer of the thumbnail image 205. That is, in FIG. 4A, when there are multiple thumbnail images, a thumbnail image temporally closer to the current time is displayed on the front layer. The present embodiment is not limited to such a display form (display order). For example, the display order when a plurality of thumbnail images are displayed on the display screen 200 may be such that a thumbnail image which has been set for a longer time as a capturing region may be displayed in the front layer.

Display of Cutout Image Position

When a single thumbnail image is selected, in order to indicate which region is to be captured, a frame line indicating the outer edge of the region in interest or a line connecting the thumbnail image in interest to a capturing region may be displayed and overlapped with the captured image 201 of the wide angle camera 110. Further, when the pointer 401 of a user operation is pointed on a thumbnail image (that is, a single thumbnail image is selected), the frame line described above or the connecting line described above may be displayed and overlapped with the captured image 201. A figure or an index such as a frame line or a connecting line is displayed on the captured image 201, and thereby a thumbnail image and a capturing region are associated with each other, which facilitates confirmation of correspondence between the thumbnail image and the capturing region.

Update Timing of Thumbnail Image

Update of a thumbnail image may be performed when a change of the pan angle, the tilt angle, or the zoom position that is greater than or equal to a predetermined value occurs to the PTZ camera 120. Further, when continuous update of thumbnail images is not allowed, the thumbnail image may be updated when no thumbnail image selection has been made by the pointer 401 for a predetermined time or longer after the capturing region is changed. Alternatively, update of a thumbnail image may be allowed when a predetermined time period has elapsed after a change of the capturing region. Thereby, for example, when there are a large number of thumbnail images, it is possible to avoid continuous update of thumbnail images due to a fine adjustment of a capturing region.

Priority of Image Delivery

In delivery of images captured by the wide angle camera 110 to the IP network 130, an image of a region displaying a cutout image (for example, the region 207 of FIG. 4A) may be delivered with a higher priority than images of other regions. In particular, when the wide angle camera 110 is formed of a plurality of cameras, by prioritizing the delivery of an image of a region in which a cutout image is displayed, the time lag between the cutout image captured by the wide angle camera 110 and an image captured by the PTZ camera 120 can be reduced.

As described above, according to the present embodiment, it is possible to change the capturing region of the PTZ camera 120 from the region 208 to the region 207 while displaying the current state of the region 207 captured in the past to the user by using the real-time images 201 and 205.

Next, a second embodiment of the present invention will be described by using FIG. 5 to FIG. 7B. In the first embodiment, the capturing region of the PTZ camera 120 is changed to a capturing region of a thumbnail image selected by the user using the pointer 401. In the second embodiment, a case when a plurality of capturing regions, in which capturing regions of the PTZ camera 120 are pre-set, are sequentially changed will be described. In the second embodiment, the capturing region of the PTZ camera 120 changes in predetermined order (circulation order). Such an image capturing may be referred to as circulation setting capturing.

A plurality of pre-set capturing regions may be referred to as a pre-set position in the following description. A change method of a capturing region and a cutout range of the imaging device 101 and a display method of a thumbnail image in the second embodiment will be described below. Note that the same reference numerals are used to the same components as those in the first embodiment, and the description thereof will be omitted. The configuration of the imaging system 10 of the second embodiment is the same as that of the first embodiment. In the following description, display on the UI display unit 140 having different form from that of the first embodiment and change of a capturing direction and a view angle (change of a pan angle, a tilt angle, and a zoom position) of the PTZ camera 120 will be described.

UI Display Unit

Figure 5:
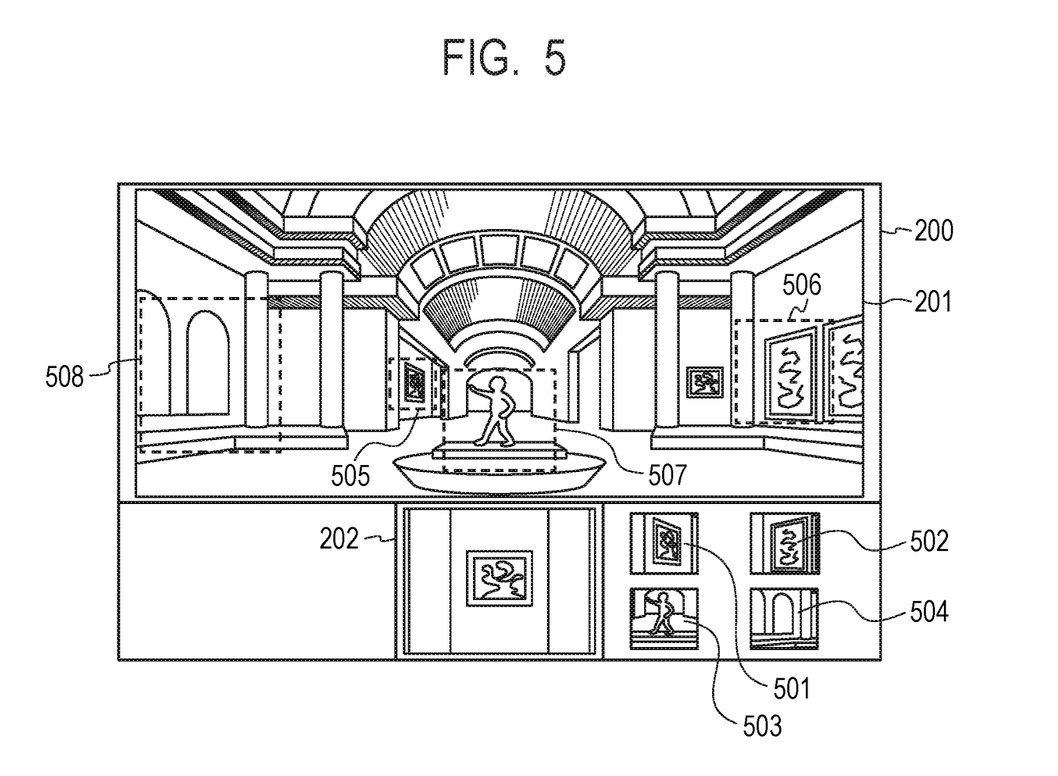
FIG. 5 is a diagram illustrating the UI display unit.

Display of an image on the UI display unit 140 will be described by using FIG. 5. Images 501, 502, 503, and 504 are each a thumbnail image in which a region that can be captured by a circulation setting capturing of the PTZ camera 120 (that is, a pre-set position) is cut out from the image 201 currently captured by the wide angle camera 110 and is displayed. That is, in the circulation setting capturing of the present embodiment, the four thumbnail images 501 to 504 are used. The user can select (set) which of the thumbnail images the circulation is started. For example, when the user selects the thumbnail image 504, the capturing region of the PTZ camera 120 changes in the order of the thumbnail images 504, 501, 502, 503, and then 504. This circulation order may be set by the UI display unit 140 based on the user instruction or may be set by the system control unit 124 of the imaging device 100, for example. In the present embodiment, the thumbnail images 501 to 504 are prepared in advance. The thumbnail image 501 corresponds to a region 505, the thumbnail image 502 corresponds to a region 506, the thumbnail image 503 corresponds to a region 507, and the thumbnail image 504 corresponds to a region 508.

A pan angle, a tilt angle, and a zoom position of the PTZ camera 120 are linked with each of the thumbnail images 501, 502, 503, and 504 and stored in the storage unit 125. Such linking enables the PTZ camera 120 to capture the regions 505 to 508 based on the thumbnail images 501 to 504.

Change of Capturing Region of PTZ Camera

Figure 6:
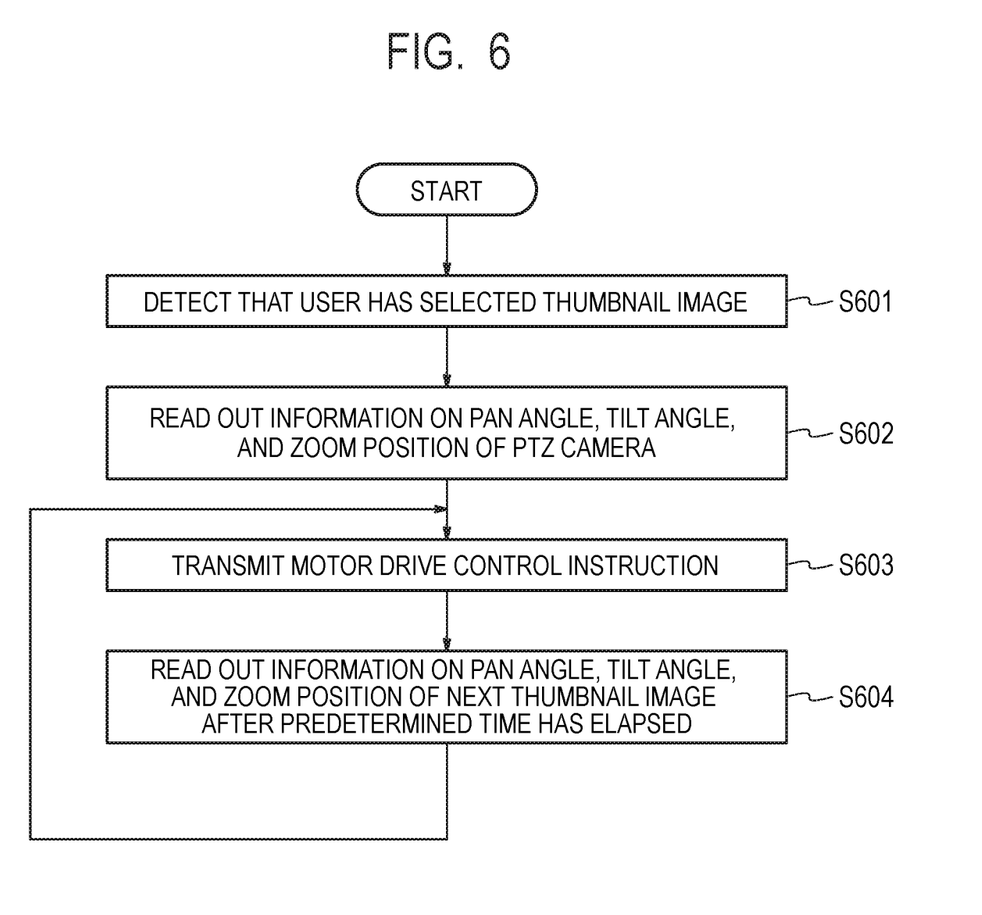
FIG. 6 is a flowchart illustrating a change method of a capturing region.

A flow of changing the pan angle, the tilt angle, and the zoom position of the PTZ camera 120 to a pan angle, a tilt angle, and a zoom position linked with the pre-set position will be described by using FIG. 6, FIG. 7A, and FIG. 7B. In the following description, a case when circulation setting capturing is started with the thumbnail image 504 will be described. The circulation setting capturing is set such that, after capturing is performed for a predetermined time at one capturing region, capturing is automatically moved to the next capturing region.

Figures 7A, 7B:
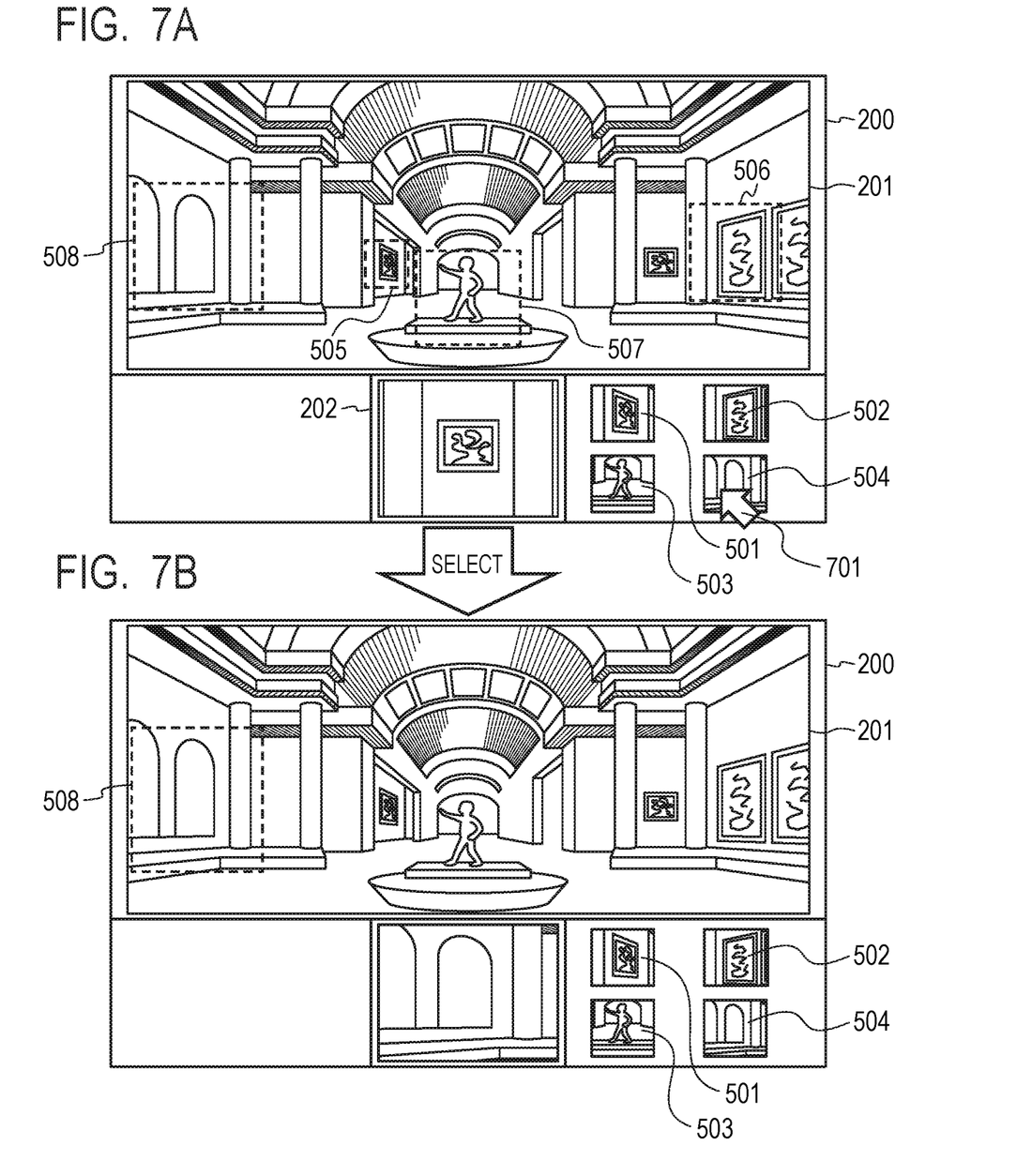
FIG. 7A and FIG. 7B are diagrams illustrating the change method of a capturing region.

As illustrated in FIG. 7A, first, the system control unit 124 (FIG. 1) detects that the user has selected the thumbnail image 504 by using a pointer 701 (S601). The system control unit 124 then reads out, from the storage unit 125, information on the pan angle, the tilt angle, and the zoom position linked with the thumbnail image 504 and stored (S602). The system control unit 124 transmits an instruction to the drive control unit 126 of the PTZ camera 120 so as to drive the zoom motor 127, the pan motor 128, and the tilt motor 129 based on the read out information on the pan angle, the tilt angle, and the zoom position (S603). That is, the system control unit 124 transmits a drive instruction of each of the motors 127 to 129 to the drive control unit 126 so that PTZ camera 120 captures the region 508. A state after the capturing region of the PTZ camera 120 has been changed is illustrated in FIG. 7B.

An image that is currently being captured by the wide angle camera 110 is displayed in the image 201. Therefore, the user can change the pan angle, the tilt angle, and the zoom position of the PTZ camera 120 after confirming the status of a pre-set position in the image 201 when changing the pan angle, the tilt angle, and the zoom position of the PTZ camera 120 to the pre-set position (the region 508). After the PTZ camera 120 captures the region 508 for a predetermined time period, the system control unit 124 reads out, from the storage unit 125, information on the pan angle, the tilt angle, and the zoom position linked with the thumbnail image 501 (S604). That is, the system control unit 124 automatically, sequentially selects the thumbnail image 501. The system control unit 124 then transmits an instruction to the drive control unit 126 of the PTZ camera 120 so as to drive each of the motors 127 to 129 based on the read out information on the pan angle, the tilt angle, and the zoom position (S603). In this way, in the circulation setting capturing, the process proceeds to S604 after S603 without updating a thumbnail image. Then, S603 and S604 are repeatedly performed. To stop the circulation setting capturing, for example, the user transmits a stop signal from the UI display unit 140 to the system control unit 124.

Note that, in the above description, while which thumbnail image the circulation setting capturing is started is determined by the user selecting a thumbnail image, a thumbnail image with which circulation setting capturing is started may be pre-set. For example, circulation setting capturing may be set to start with the thumbnail image 501. Further, while circulation setting capturing is started by the user selecting the thumbnail image 504 in the flowchart of FIG. 6, the circulation setting capturing may be started in response to the UI display unit 140 being powered on, for example. Furthermore, the time period in which capturing is performed may be different for the four pre-set positions 505 to 508. For example, the time period in which capturing is performed at the pre-set position 505 may be shorter than the time period in which capturing is performed at the pre-set position 507. While the four thumbnail images 501 to 504 are used to perform circulation setting capturing in the example of FIG. 7A and FIG. 7B, the number of thumbnail images used in circulation setting capturing is not limited to four.

According to the second embodiment, the user can change the pan angle, the tilt angle, and the zoom position of the PTZ camera 120 after confirming the status of a pre-set position in the image when changing the pan angle, the tilt angle, and the zoom position of the PTZ camera 120 to the pre-set position 508. Further, also for the pre-set positions 505, 506, and 507 captured automatically after the pre-set position 508, the current status of the present position (region) in interest can be confirmed. Furthermore, according to the second embodiment, a plurality of pre-set positions (capturing regions) can be captured with automatic circulation at predetermined time intervals.

While the wide angle camera 110 is formed of a single camera without means for changing a capturing direction and a zoom position in the first embodiment and the second embodiment, the wide angle camera 110 is not limited to such a configuration. The wide angle camera 110 may be formed of a plurality of cameras or may be formed of a camera capable of changing a capturing direction and a zoom position (for example, a PTZ camera). While described as a personal computer, for example, the UI display unit 140 may be a server. Further, while described as being accommodated in a single casing, the wide angle camera 110 and the PTZ camera 120 may be accommodated in separate casings. That is, the imaging device 100 may not be configured such that two cameras (wide angle cameras 110) are integrated.

Setting Change by User

By transmitting a setting change instruction from the UI display unit 140 to the wide angle camera 110, the user is able to switch which of the past capturing region or the circulation setting capturing region of the PTZ camera 120 is cut out and displayed as a thumbnail image. Similarly, the user is also able to transmit a drive control instruction to the drive control unit 126 via the UI display unit 140 to drive various motors (127, 128, 129) and to change the capturing region of the PTZ camera 120. Further, it is possible to change the size of a thumbnail image or a display position (layout) of an image through the UI display unit 140. Further, while the example in which the present invention is implemented in the imaging device 100 has been described above, the present invention may be implemented on the client device side. In the case of implementation on the client device side, the client device holds information indicating which portion of an image captured by the wide angle camera 110 is to be displayed on a viewer as a thumbnail and, when each thumbnail is selected, information indicating which position the PTZ camera 120 is to be PTZ-controlled. Further, when one of the thumbnails is selected, an instruction to drive the PTZ camera 120 to the corresponding PTZ position can be issued.

Advantageous Effect

According to the present invention, an image of the second capturing region is cut out from an image in which the first capturing region is captured, and the cut out image is displayed, which can facilitate the user to confirm a state of the second capturing region.

OTHER EMBODIMENTS

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging device comprising:
a first imaging unit that captures a first capturing region to obtain a first image;
a second imaging unit configured to capture a second capturing region to obtain a second image, wherein the second capturing region to be captured can be changed;
an output unit configured to output a cutout image which is obtained from the first image and that corresponds to a second capturing region that was captured by the second imaging unit; and
a change unit configured to control, in a case when one of a plurality of cutout images output by the output unit is selected, the second imaging unit to capture a second capturing region corresponding to the selected cutout image.

2. The imaging device according to claim 1, further comprising a setting unit configured to set a circulation order for the plurality of cutout images,
wherein the change unit sequentially changes the second capturing region in accordance with the circulation order.

3. The imaging device according to claim 1, wherein the first image is associated with the cutout image by using a figure or an index to allow to identification correspondence between the first image and the cutout image.

4. The imaging device according to claim 1, wherein, in a case when one of the plurality of cutout images is selected, a region of the selected cutout image is to be overlapped with the first image of the first capturing region so as to be displayed.

5. The imaging device according to claim 1, wherein, in a case when one of the plurality of cutout images is selected, a region of the selected cutout image is to be overlapped with the first capturing region so as to be displayed.

6. The imaging device according to claim 1, wherein the output unit outputs, to a client device, (a) the plurality of cutout images, (b) a first image currently obtained by the first imaging unit, and (c) a second image currently obtained by the second imaging unit, such that (i) the plurality of cutout images, (ii) the first image, and (iii) the second image are to be displayed by the client device.

7. The imaging device according to claim 1, further comprising an update unit configured to delete, in a case when the second capturing region is changed by the change unit, in response to selecting one of the plurality of cutout images, the selected cutout image from the plurality of cutout images and causes a client device to display a cutout image, which is obtained from the first image, corresponding to the latest second capturing region that has been captured by the second imaging unit.

8. The imaging device according to claim 1, wherein the first imaging unit is a wide angle camera or a pan-tilt-zoom camera, and the second imaging unit is a pan-tilt-zoom camera.

9. The imaging device according to claim 1, wherein the cutout image is a thumbnail image.

10. The imaging device according to claim 1, wherein the cutout image corresponding to the second capturing region that was captured by the second imaging unit is obtained by cutting out the second capturing region from the first image.

11. The imaging device according to claim 2, wherein the change unit sequentially changes the second imaging region at predetermined time intervals in accordance with the circulation order.

12. The imaging device according to claim 7, wherein, in a case when there is a change of a pan angle, a tilt angle, or a zoom position of the second imaging unit that is greater than or equal to a predetermined value, the update unit deletes the selected cutout image from the plurality of cutout images and causes the client device to display a cutout image, which is obtained from the first image, corresponding to the latest second capturing region that has been captured by the second imaging unit.

13. The imaging device according to claim 7, wherein, in a case when a predetermined time period has elapsed after a change of a pan angle, a tilt angle, or a zoom position of the second imaging unit, the update unit deletes the selected cutout image from the plurality of cutout images and causes the client device to display a cutout image, which is obtained from the first image, corresponding to the last second capturing region that has been captured by the second imaging unit.

14. A display device comprising:
a first display unit configured to cause a display to display a first image of a first capturing region captured by a first imaging unit; and
a second display unit configured to cause the display to display a second image of a second imaging unit, the second capturing region being narrower than the first capturing region,
wherein a cutout image, which is obtained from the first image, corresponding to a second capturing region that was captured by the second imaging unit in the past, is displayed on the display.

15. The display device according to claim 14, wherein the cutout image is a thumbnail image.

16. The display device according to claim 14, wherein the cutout image corresponding to the second capturing region that was captured by the second imaging unit is obtained by cutting out the second capturing region from the first image captured by the first imaging unit.

17. The display device according to claim 14, wherein the first image captured in real time by the first imaging unit, the second image captured in real time by the second imaging unit, and the cutout image are displayed simultaneously.

18. The display device according to claim 14, wherein a plurality of the cutout images, each of which is obtained from the first image and corresponds to a second capturing region captured by the second imaging unit in the past, are displayed on the display, and
wherein one of the plurality of cutout images can be selected by a user such that the second imaging unit is controlled so as to capture a second capturing region corresponding to the selected cutout image.

19. An imaging method comprising:
capturing a first capturing region to obtain a first imaging unit by using a first imaging unit;
capturing a second capturing region to obtain a second image by using a second imaging unit, wherein the second capturing region to be captured can be changed;
outputting a cutout image, which is obtained from the first image, corresponding to a second capturing region that was captured by the second imaging unit; and
controlling, in a case when one of the plurality of cutout images outputted in the outputting is selected, the second imaging unit such that the second imaging unit captures a second capturing region corresponding to the selected cutout image.

20. A display method comprising:
causing a display to display a first image of a first capturing region captured by a first imaging unit; and
causing the display to display a second capturing region captured by a second imaging unit, the second capturing region being narrower than the first capturing region,
wherein a cutout image, which is obtained from the first image, corresponding to a second capturing region that was captured by the second imaging unit in the past, is displayed on the display.

21. A non-transitory recording medium readable by a computer and storing a program that causes the computer to perform a method, the method comprising:
causing a first imaging unit to capture a first capturing region to obtain a first image;
causing a second imaging unit to capture a second capturing region to obtain a second image, wherein the second capturing region to be captured can be changed;
outputting a cutout image that is obtained from the first image and corresponds to a second capturing region that was captured by the second imaging unit; and
controlling, in a case when, one of the plurality of cutout images outputted in the outputting is selected, the second imaging unit, such that the second imaging unit captures a second capturing region corresponding to the selected cutout image.

22. A non-transitory recording medium readable by a computer and storing a program that causes the computer to perform a method, the method comprising:
causing a display to display a first image of a first capturing region captured by a first imaging unit; and
causing the display to display a second image of a second capturing region captured by a second imaging unit, the second capturing region being narrower than the first capturing region,
wherein a cutout image, which is obtained from the first image, corresponding to a second capturing region that was captured by the second imaging unit in the past, is displayed on the display.

* * * * *